United States Patent
Zhang et al.

(10) Patent No.: US 11,165,449 B2
(45) Date of Patent: Nov. 2, 2021

(54) LTE FREQUENCY BAND SWITCHING DEVICE AND METHOD, AND MOBILE TERMINAL

(71) Applicant: JRD Communication (Shenzhen) LTD., Shenzhen (CN)

(72) Inventors: Hua Zhang, Shenzhen (CN); Zhicong Yu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 29 days.

(21) Appl. No.: 16/637,754

(22) PCT Filed: Aug. 9, 2018

(86) PCT No.: PCT/CN2018/099634
§ 371 (c)(1),
(2) Date: Feb. 9, 2020

(87) PCT Pub. No.: WO2019/029625
PCT Pub. Date: Feb. 14, 2019

(65) Prior Publication Data
US 2020/0186173 A1    Jun. 11, 2020

(30) Foreign Application Priority Data
Aug. 9, 2017    (CN) .......................... 201710676067.0

(51) Int. Cl.
*H04B 1/00*        (2006.01)
*H04L 5/14*        (2006.01)
(52) U.S. Cl.
CPC ............... *H04B 1/006* (2013.01); *H04L 5/14* (2013.01)

(58) Field of Classification Search
CPC ...................................................... H04B 1/006
See application file for complete search history.

(56) References Cited

U.S. PATENT DOCUMENTS 8,149,742 B1    4/2012    Sorsby
9,810,579 B1    11/2017    Chou
(Continued)

FOREIGN PATENT DOCUMENTS

CN        101656514        2/2010
CN        202103661        1/2012
(Continued)

OTHER PUBLICATIONS

International Search Report and the Written Opinion Dated the International Searching Authority Re. Application No. PCT/CN2018/099634 and Translation of Search Report Into English. (9 Pages).
(Continued)

*Primary Examiner* — Kodzovi Acolatse
*Assistant Examiner* — Abdeltif Ajid

(57) ABSTRACT

An LTE frequency band switching device and method, and a mobile terminal are provided. The device includes a power amplification module, a switching module, a duplexer, an antenna switch and an antenna. An output signal is outputted to the switching module after being amplified by the power amplification module; the switching module divides same into a plurality of frequency band signals, and selects a current working frequency band according to a switching instruction; the duplexer controls the transceiving of a working frequency band signal; and when the antenna switch is turned on, the current working frequency band signal is transceived by the antenna.

16 Claims, 4 Drawing Sheets

(56) References Cited

U.S. PATENT DOCUMENTS

| | | | |
|---|---|---|---|
| 2013/0163577 A1 | 1/2013 | Feng | |
| 2013/0273860 A1 | 10/2013 | Pehlke | |
| 2014/0329475 A1 | 11/2014 | Ellac et al. | |
| 2014/0355497 A1 | 12/2014 | Reiha | |
| 2018/0152945 A1* | 5/2018 | Balteanu | H04L 5/001 |
| 2019/0229756 A1* | 7/2019 | Liu | H04B 1/52 |

FOREIGN PATENT DOCUMENTS

| | | |
|---|---|---|
| CN | 102404022 | 4/2012 |
| CN | 102510297 | 6/2012 |
| CN | 103178791 | 6/2013 |
| CN | 103475386 | 12/2013 |
| CN | 104378070 | 2/2015 |
| CN | 204697014 | 10/2015 |
| CN | 205545166 | 8/2016 |
| CN | 106454636 | 2/2017 |
| CN | 106688192 | 5/2017 |
| CN | 206235399 | 6/2017 |
| CN | 107395221 | 11/2017 |
| CN | 206620115 | 11/2017 |
| WO | PCT WO 2019/029625 | 2/2019 |

OTHER PUBLICATIONS

Richardson Electrics "1 Watt RFIC Power Amplifier 800 to 2000 MHz Operation", Pacific Monolithics, Richardson Electrics, XP002241148, Data Sheet, PM 2105, p. 1-4, Jun. 30, 2000.

Notification of Office Action and Search Report dated Feb. 2, 2021 From the State Intellectual Property Office of the People's Republic of China Re. Application No. 201710676067.0. (9 Pages).

Notification of Office Action and Search Report dated Aug. 4, 2020 From the State Intellectual Property Office of the People's Republic of China Re. Application No. 201710676067.0. (10 Pages).

\* cited by examiner

LTE FREQUENCY BAND SWITCHING DEVICE AND METHOD, AND MOBILE TERMINAL

RELATED APPLICATIONS

This application is a National Phase of PCT Patent Application No. PCT/CN2018/099634 having International filing date of Aug. 9, 2018, which claims the benefit of priority of Chinese Patent Application No. 201710676067.0 filed on Aug. 9, 2017. The contents of the above applications are all incorporated by reference as if fully set forth herein in their entirety.

FIELD AND BACKGROUND OF THE INVENTION

The present invention relates to communication technologies, and more particularly to a Long-Term Evolution (LTE) frequency band switching device and method, and a mobile terminal.

Long-Term Evolution (LTE) is a long-term evolution of a Universal Mobile Telecommunications System (UMTS) standard formulated by the 3rd Generation Partnership Project (3GPP), officially established and launched at 3GPP Toronto Conference in December, 2004. At present, existing LTE designs are using SP4T switches integrated in a multi-mode multi-frequency power amplifier (MMMB PA) to achieve the requirements of multi-path high frequency bands. A specific structural design is shown in FIG. 1.

However, with releasing of more high frequency bands in the future, more high-frequency resources can be used, and more high-frequency bands are needed for the projects. A power amplifier with only four high-frequency paths no longer satisfies the needs, and a new power amplifier or other solutions are needed to support more LTE high-frequency bands. This will inevitably increase the cost of manufacture and design.

Therefore, the existing arts are needed to be improved.

SUMMARY OF THE INVENTION

The embodiments of the present invention provide an LTE frequency band switching device and method, and a mobile terminal, for adopting a combination of a low-cost single-path power amplification module and a switching module to implement multi-path frequency band communication and switching, which flexibly satisfies the requirement of multiple frequency bands and also saves the cost.

In a first aspect, the embodiments of the present invention provide an Long-Term Evolution (LTE) frequency band switching device, including a power amplification module, a switching module, a duplexer, an antenna switch and an antenna, wherein an output signal is outputted to the switching module after being amplified by the power amplification module; the switching module divides the output signal into a plurality of frequency band signals and selects a current working frequency band according to a switching instruction; the duplexer controls transceiving of a working frequency band signal; and when the antenna switch is turned on, a current working frequency band signal is received or transmitted by the antenna.

Further, in the LTE frequency band switching device, the power amplification module includes a multi-mode multi-frequency power amplifier and a first filtering unit, the first filtering unit performs a filtering process on a first power supply voltage inputted to the multi-mode multi-frequency power amplifier, the multi-mode multi-frequency power amplifier performs a amplifying process on the output signal and then outputs the output signal to the switching module.

Further, in the LTE frequency band switching device, the switching module includes a switch and a second filtering unit, the second filtering unit performs a filtering process on a second power supply voltage of the switch, the switch receives the amplified output signal, divides the output signal into the plurality of frequency band signals and selects the current working frequency band according to the switching instruction.

Further, in the LTE frequency band switching device, the switch is configured to receive the amplified output signal, divides the output signal into a first frequency band signal, a second frequency band signal, a third frequency band signal and a fourth frequency band signal, and selects the current working frequency band according to the switching instruction.

Further, in the LTE frequency band switching device, the first filtering unit includes a first capacitor, a second capacitor, a third capacitor, a fourth capacitor, a fifth capacitor and a sixth capacitor, one end of the first capacitor is connected to one end of the second capacitor, one end of the fourth capacitor, one end of the sixth capacitor and a first power supply end, the one end of the second capacitor is further connected to one end of the third capacitor and a 28th pin of the multi-mode multi-frequency power amplifier, the one end of the fourth capacitor is further connected to one end of the fifth capacitor and a 29th pin of the multi-mode multi-frequency power amplifier, the one end of the sixth capacitor is further connected to a 30th pin of the multi-mode multi-frequency power amplifier, all of the other ends of the first capacitor, the second capacitor, the third capacitor, the fourth capacitor, the fifth capacitor and the sixth capacitor are grounded.

Further, in the LTE frequency band switching device, the second filtering unit includes a seventh capacitor, an eighth capacitor, a ninth capacitor and a tenth capacitor, one end of the seventh capacitor is connected to a fifth pin of the switch, one end of the eighth capacitor is connected to a sixth pin of the switch, one end of the ninth capacitor is connected to a seventh pin of the switch, one end of the tenth capacitor is connected to a fourth pin of the switch and a second power supply end, all of the other ends of the seventh capacitor, the eighth capacitor, the ninth capacitor and the tenth capacitor are grounded; a ninth pin of the switch is an output end of the first frequency band signal, a tenth pin of the switch is the output end of the second frequency band signal, a second pin of the switch is the output end of the third frequency band signal, a third pin of the switch is the output end of the fourth frequency band signal.

Further, in the LTE frequency band switching device, the multi-mode multi-frequency power amplifier is AP7219M.

Further, in the LTE frequency band switching device, the switch is RF8614.

In a second aspect, the embodiments of the present invention further provide an LTE frequency band switching method, which includes steps of:

outputting an output signal to a switching module after the output signal is amplified by a power amplification module;

by the switching module, dividing the output signal into a plurality of frequency band signals and selecting a current working frequency band according to a switching instruction;

controlling transceiving of a working frequency band signal by a duplexer, and receiving or transmitting a current working frequency band signal by an antenna when an antenna switch is turned on.

In a third aspect, the embodiments of the present embodiment further provide a mobile terminal, including a radio frequency (RF) circuit and an Long-Term Evolution (LTE) frequency band switching device disposed in the RF circuit, the LTE frequency band switching device including a power amplification module, a switching module, a duplexer, an antenna switch and an antenna, wherein an output signal is outputted to the switching module after being amplified by the power amplification module; the switching module divides the output signal into a plurality of frequency band signals and selects a current working frequency band according to a switching instruction; the duplexer controls transceiving of a working frequency band signal; and when the antenna switch is turned on, a current working frequency band signal is received or transmitted by the antenna; the LTE frequency band switching device further including a conversion matching module for impedance matching.

Further, in the mobile terminal, the power amplification module includes a multi-mode multi-frequency power amplifier and a first filtering unit, the first filtering unit performs a filtering process on a first power supply voltage inputted to the multi-mode multi-frequency power amplifier, the multi-mode multi-frequency power amplifier performs a amplifying process on the output signal and then outputs the output signal to the switching module.

Further, in the mobile terminal, the first filtering unit is connected to the multi-mode multi-frequency power amplifier and the multi-mode multi-frequency power amplifier is connected to the switching module.

Further, in the mobile terminal, the switching module includes a switch and a second filtering unit, the second filtering unit performs a filtering process on a second power supply voltage of the switch, the switch receives the amplified output signal, divides the output signal into the plurality of frequency band signals and selects the current working frequency band according to the switching instruction.

Further, in the mobile terminal, the second filtering unit is connected to the switch and a common end of the switch is connected to an output pin of the multi-mode multi-frequency power amplifier.

Further, in the mobile terminal, the switch is configured to receive the amplified output signal, divides the output signal into a first frequency band signal, a second frequency band signal, a third frequency band signal and a fourth frequency band signal, and selects the current working frequency band according to the switching instruction.

Further, in the mobile terminal, the first filtering unit includes a first capacitor, a second capacitor, a third capacitor, a fourth capacitor, a fifth capacitor and a sixth capacitor, one end of the first capacitor is connected to one end of the second capacitor, one end of the fourth capacitor, one end of the sixth capacitor and a first power supply end, the one end of the second capacitor is further connected to one end of the third capacitor and a 28th pin of the multi-mode multi-frequency power amplifier, the one end of the fourth capacitor is further connected to one end of the fifth capacitor and a 29th pin of the multi-mode multi-frequency power amplifier, the one end of the sixth capacitor is further connected to a 30th pin of the multi-mode multi-frequency power amplifier, all of the other ends of the first capacitor, the second capacitor, the third capacitor, the fourth capacitor, the fifth capacitor and the sixth capacitor are grounded.

Further, in the mobile terminal, the second filtering unit includes a seventh capacitor, an eighth capacitor, a ninth capacitor and a tenth capacitor, one end of the seventh capacitor is connected to a fifth pin of the switch, one end of the eighth capacitor is connected to a sixth pin of the switch, one end of the ninth capacitor is connected to a seventh pin of the switch, one end of the tenth capacitor is connected to a fourth pin of the switch and a second power supply end, all of the other ends of the seventh capacitor, the eighth capacitor, the ninth capacitor and the tenth capacitor are grounded; a ninth pin of the switch is an output end of the first frequency band signal, a tenth pin of the switch is the output end of the second frequency band signal, a second pin of the switch is the output end of the third frequency band signal, a third pin of the switch is the output end of the fourth frequency band signal.

Further, in the mobile terminal, the conversion matching module includes a converter, a eleventh capacitor, a twelfth capacitor and an inductor, one end of the eleventh capacitor is connected to a second pin of the converter, one end of the twelfth capacitor is connected to a sixth pin of the converter, all of the other ends of the eleventh capacitor and the twelfth capacitor are grounded, a fifth pin of the converter is connected to a 42th pin of the multi-mode multi-frequency power amplifier.

Further, in the mobile terminal, the multi-mode multi-frequency power amplifier is AP7219M.

Further, in the mobile terminal, the switch is RF8614.

Compared to the existing arts, in the LTE frequency band switching device and method, and the mobile terminal provided in the present invention, the device includes a power amplification module, a switching module, a duplexer, an antenna switch and an antenna. An output signal is outputted to the switching module after being amplified by the power amplification module; the switching module divides same into a plurality of frequency band signals, and selects a current working frequency band according to a switching instruction; the duplexer controls the transceiving of a working frequency band signal; and when the antenna switch is turned on, the current working frequency band signal is transceived by the antenna. By adopting a combination of a low-cost single-path power amplification module and a switching module, multi-path frequency band communication and switching is realized. This not only flexibly satisfies the requirement of multiple frequency bands but also saves the cost.

DESCRIPTION OF SPECIFIC EMBODIMENTS OF THE INVENTION

In view of drawbacks of the existing arts adopting the switches integrated into a power amplifier to implement multi-path frequency bands, which cannot satisfy requirements of low cost and more and more high frequency resources at the same time, the objective of the present invention is to provide an Long-Term Evolution (LTE) frequency band switching device and method, and a mobile terminal, for adopting a combination of a low-cost single-path power amplification module and a switching module to implement multi-path frequency band communication and switching, which flexibly satisfies the requirement of multiple frequency bands and also saves the cost.

To make the objectives, technical schemes, and effects of the present invention more clear and specific, the present invention is described in further detail below with reference to the embodiments in accompanying with the appending drawings. It should be understood that the specific embodiments described herein are merely for interpreting the present invention and the present invention is not limited thereto.

Figure 1:
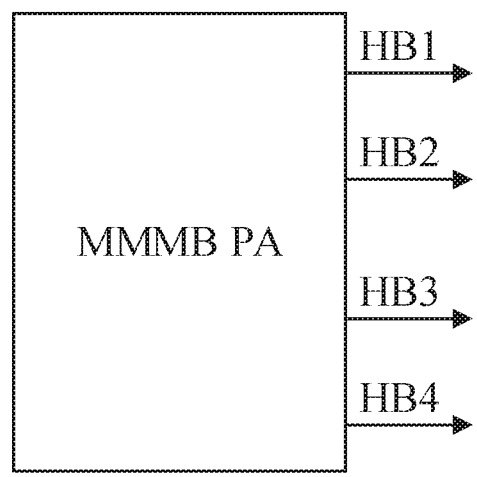
FIG. 1 is a diagram showing a design of LTE multiple frequency band structure in existing arts.
Figure 2:
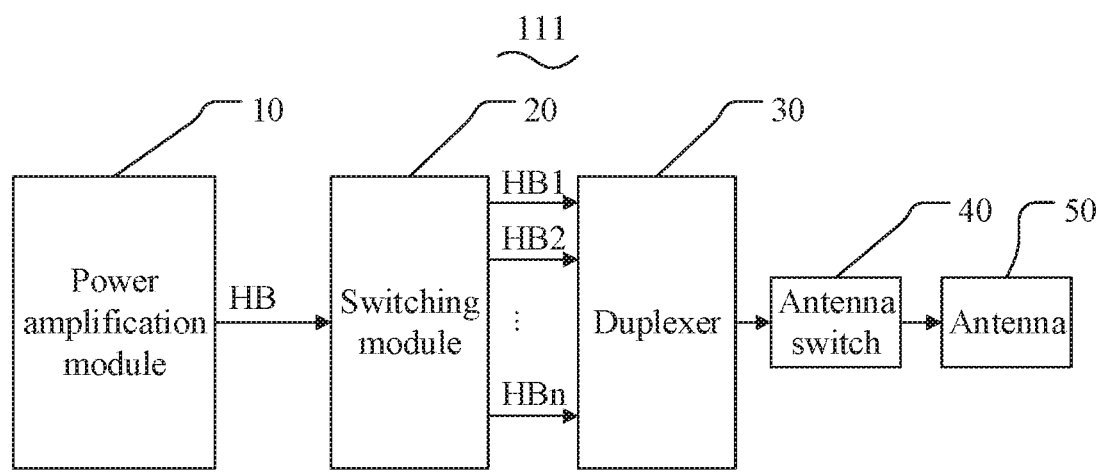
FIG. 2 is a structural block diagram showing an LTE frequency band switching device provided in an embodiment of the present invention.
Figure 3:
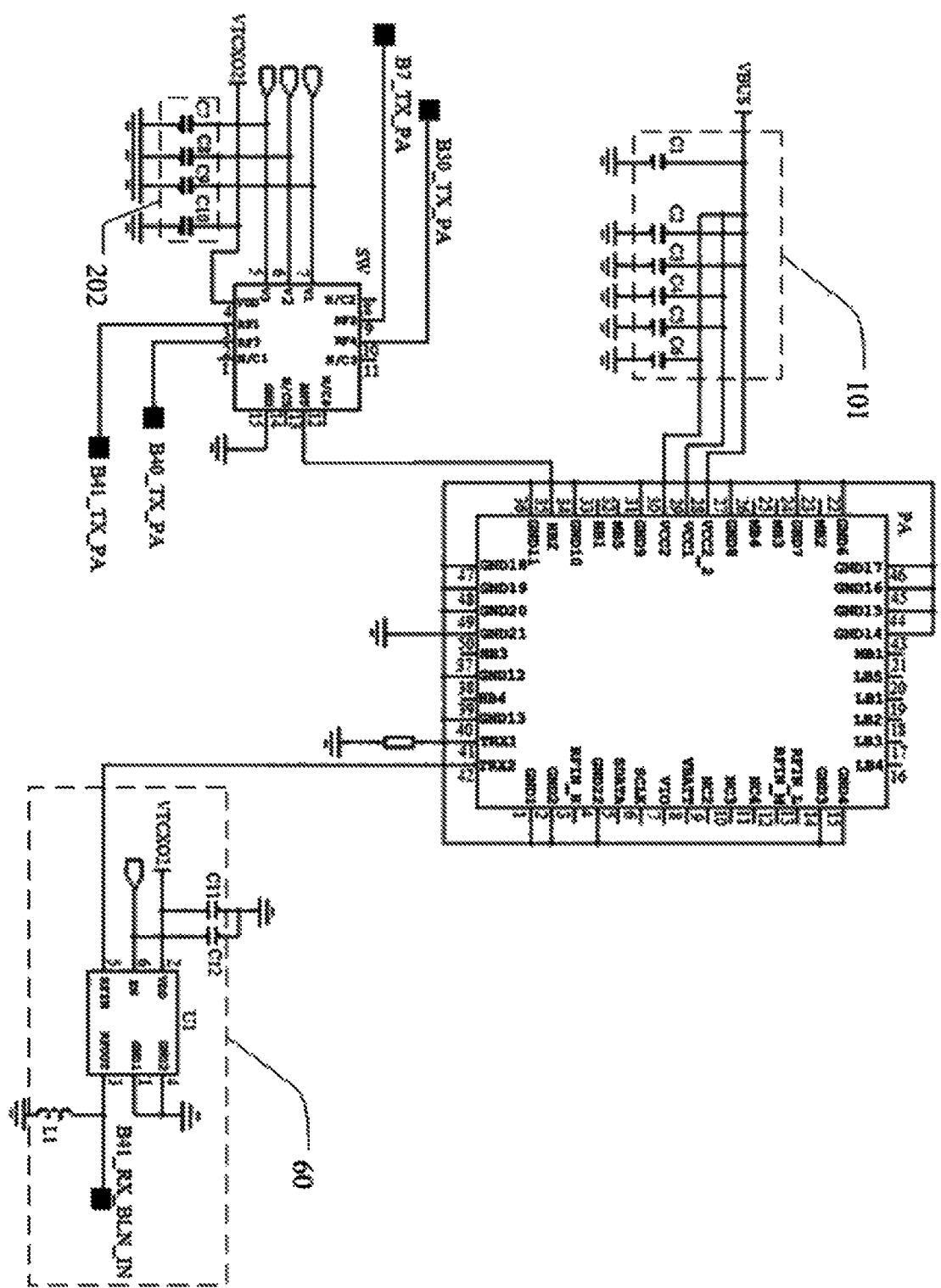
FIG. 3 is a circuit diagram showing a power amplification module and a switching module in the LTE frequency band switching device provided in an embodiment of the present invention.

Referring to FIGS. 2 and 3, the LTE frequency band switching device provided in the present invention includes a power amplification module 10, a switching module 20, a duplexer 30, an antenna switch 40 and an antenna 50. The power amplification module 10, the switching module 20, the duplexer 30, the antenna switch 40 and the antenna 50 are connected in series. The power amplification module 10 is configured to amplify an output signal and output a single-path signal (indicated by HB shown in FIG. 2) to the switching module 20. The switching module 20 is configured to divide the output signal into a plurality of frequency band signals (indicated by HB1, HB2, . . . , HBn shown in FIG. 2) and select a current working frequency band according to a switching instruction. The duplexer 30 is configured to control transceiving of a working frequency band signal. The antenna switch 40 is configured to control a working state of the antenna 50. When the antenna switch 40 is turned on, a current working frequency band signal is received or transmitted by the antenna 50.

That is, in the present invention, an output signal is outputted to the switching module 20 after being amplified by the power amplification module 10. The switching module 20 divides the output signal into a plurality of frequency band signals and selects a current working frequency band according to a switching instruction. A user may transmit a frequency band switching instruction based on currently desired frequency band to control the switching module 20 to switch to or select the current working frequency band based on the switching instruction. After that, the duplexer 30 controls transceiving of a working frequency band signal. When the antenna switch 40 is turned on, a current working frequency band signal is received or transmitted by the antenna 50. Accordingly, by a combination of the single-path power amplification module 10 and a switching module 20, multi-path frequency band communication and switching is realized, satisfying the requirement of multiple frequency bands. Meanwhile, since the single-path power amplification module 10 is adopted, the cost of manufacture and design is effectively saved.

Specifically, the power amplification module 10 includes a multi-mode multi-frequency power amplifier PA and a first filtering unit 101 connected to the multi-mode multi-frequency power amplifier PA. The multi-mode multi-frequency power amplifier PA is further connected to the switching module 20. The first filtering unit 101 performs a filtering process on a first power supply voltage inputted to the multi-mode multi-frequency power amplifier PA. The multi-mode multi-frequency power amplifier PA performs an amplifying process on the output signal and then outputs the output signal to the switching module 20. By adopting the first filtering unit 101 to perform the filtering process on the first power supply voltage of the multi-mode multi-frequency power amplifier PA, the present invention reduces ripple voltages. By adopting the multi-mode multi-frequency power amplifier PA to perform the amplifying process on the output signal, the present invention outputs a single-path HB signal. In the present embodiment, a power amplifier with a model name AP7219M is adopted as the multi-mode multi-frequency power amplifier PA. This type of power amplifier is a device with a single-path signal HB and is low in cost such that development cycle of a new device can be omitted, and the developing and manufacturing cost can be effectively saved. Of course, other power amplifiers having same functions may be adopted in other embodiments, and the present invention is not limited thereto.

Specifically, the first filtering unit 101 includes a first capacitor C1, a second capacitor C2, a third capacitor C3, a fourth capacitor C4, a fifth capacitor C5 and a sixth capacitor C6. One end of the first capacitor C1 is connected to one end of the second capacitor C2, one end of the fourth capacitor C4, one end of the sixth capacitor C6 and a first power supply end (i.e., VBUS in the present embodiment). The one end of the second capacitor C2 is further connected to one end of the third capacitor C3 and a 28th pin of the multi-mode multi-frequency power amplifier PA, the one end of the fourth capacitor C4 is further connected to one end of the fifth capacitor C5 and a 29th pin of the multi-mode multi-frequency power amplifier PA, and the one end of the sixth capacitor C6 is further connected to a 30th pin of the multi-mode multi-frequency power amplifier PA. All of the other ends of the first capacitor C1, the second capacitor C2, the third capacitor C3, the fourth capacitor C4, the fifth capacitor C5 and the sixth capacitor C6 are grounded.

Further, the switching module 20 includes a switch SW and a second filtering unit 202 connected to the switch SW. A common end ANT of the switch SW is further connected to a HB2 output pin of the multi-mode multi-frequency power amplifier PA. The second filtering unit 202 performs a filtering process on a second power supply voltage of the switch SW to reduce ripple voltages. The switch SW receives the amplified output signal, divides the output signal into the plurality of frequency band signals and selects the current working frequency band according to the switching instruction.

Preferably, the switch SW is configured to receive the amplified output signal, divides the output signal into a first frequency band signal, a second frequency band signal, a third frequency band signal and a fourth frequency band signal, and selects the current working frequency band according to the switching instruction. Specifically, the second filtering unit 202 includes a seventh capacitor C7, an eighth capacitor C8, a ninth capacitor C9 and a tenth capacitor C10. One end of the seventh capacitor C7 is connected to a fifth pin of the switch SW, one end of the eighth capacitor C8 is connected to a sixth pin of the switch SW, one end of the ninth capacitor C9 is connected to a seventh pin of the switch SW, one end of the tenth capacitor C10 is connected to a fourth pin of the switch SW and a second power supply end (i.e., VTCXO2 in the present embodiment). All of the other ends of the seventh capacitor C7, the eighth capacitor C8, the ninth capacitor C9 and the tenth capacitor C10 are grounded. A ninth pin of the switch SW is an output end (e.g., B7_TX_PA in the present embodiment) of the first frequency band signal, a tenth pin of the switch SW is the output end (e.g., B30_TX_PA in the present embodiment) of the second frequency band signal, a second pin of the switch SW is the output end (e.g., B40_TX_PA in the present embodiment) of the third frequency band signal, and a third pin of the switch SW is the output end (e.g., B41_TX_PA in the present embodiment) of the fourth frequency band signal. It is noted that both of the aforesaid first power supply end and second power supply end are voltage output ends of other power supply modules and supply power to the multi-mode multi-frequency power amplifier PA and the switch SW respectively. This belongs to an existing skill and is not repeated herein.

In the present embodiment, a single-pole multi-throw switch with a model name RF8614 is adopted as the switch SW. A signal outputted from a HB2 output pin of the multi-mode multi-frequency power amplifier PA is connected to the common end ANT of the switch SW. After that, the switch SW divides the output signal into high frequency signals in four paths, that is, B7/B30/B40/B70 frequency bands as shown in FIG. 3, and outputs them simultaneously. It should be understood that the switch SW provided in the present invention are not limited to outputting high frequency signals in four paths. The number of outputted frequency bands may increase or decrease based on actual needs as long as a corresponding switch SW is used. The number of frequency bands is not limited in the present invention. By adopting a combination of the multi-mode multi-frequency power amplifier PA and the switch SW to implement an output of multi-path frequency band signals, the present invention is not restricted by output ports of switches inside a power amplifier and a back-end switch SW may be selected according to actual demands of a customer on specific frequency bands. The design is simple and feasible. Using switches with different poles for different frequency band requirements can be achieved so as to implement compatibility design, improving flexibility of a switching device.

Preferably, the LTE frequency band switching device provided in the present invention further includes a conversion matching module 60 for impedance matching. The conversion matching module 60 is connected to the multi-mode multi-frequency power amplifier PA. As shown in FIG. 3, in the present embodiment, the conversion matching module 60 serves as a balun of B41 frequency band. When transmitting and receiving signals, a balanced circuit and an unbalanced circuit have different electric properties and thus cannot be directly connected to each other. By adopting the conversion matching module 60 to provide an impedance conversion for two different types of circuits for impedance matching, reduction on interferences in realized. Specifically, the conversion matching module 60 includes a converter U1, an eleventh capacitor C11, a twelfth capacitor C12 and an inductor L1. One end of the eleventh capacitor C11 is connected to a second pin of the converter U1, and one end of the twelfth capacitor C12 is connected to a sixth pin of the converter U1. All of the other ends of the eleventh capacitor C11 and the twelfth capacitor C12 are grounded. A fifth pin of the converter U1 is connected to a 42th pin of the multi-mode multi-frequency power amplifier PA. A third pin of the converter U1 is an input end (i.e., B41_RX_BLN_IN) receiving B41 frequency band signal. The input end is further grounded via the inductor L1.

Figure 4:
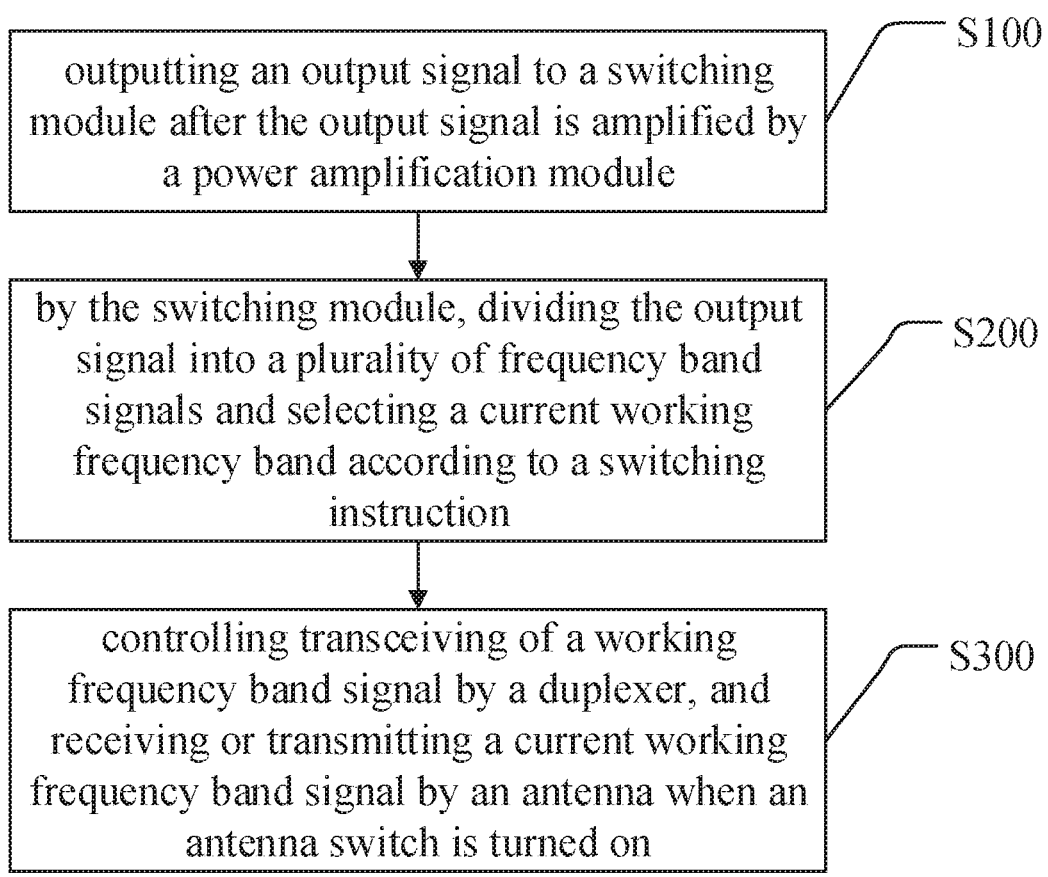
FIG. 4 is a flowchart of an LTE frequency band switching method provided in an embodiment of the present invention.

Based on the afore-described LTE frequency band switching device, the present invention further correspondingly provides an LTE frequency band switching method. As shown in FIG. 4, the LTE frequency band switching method includes steps of:

Step S100—outputting an output signal to a switching module after the output signal is amplified by a power amplification module;

Step S200—by the switching module, dividing the output signal into a plurality of frequency band signals and selecting a current working frequency band according to a switching instruction;

Step S300—controlling transceiving of a working frequency band signal by a duplexer, and receiving or transmitting a current working frequency band signal by an antenna when an antenna switch is turned on.

Based on the afore-described LTE frequency band switching device, the present invention further correspondingly provides a mobile terminal, which includes the LTE frequency band switching device described above.

Figure 5:
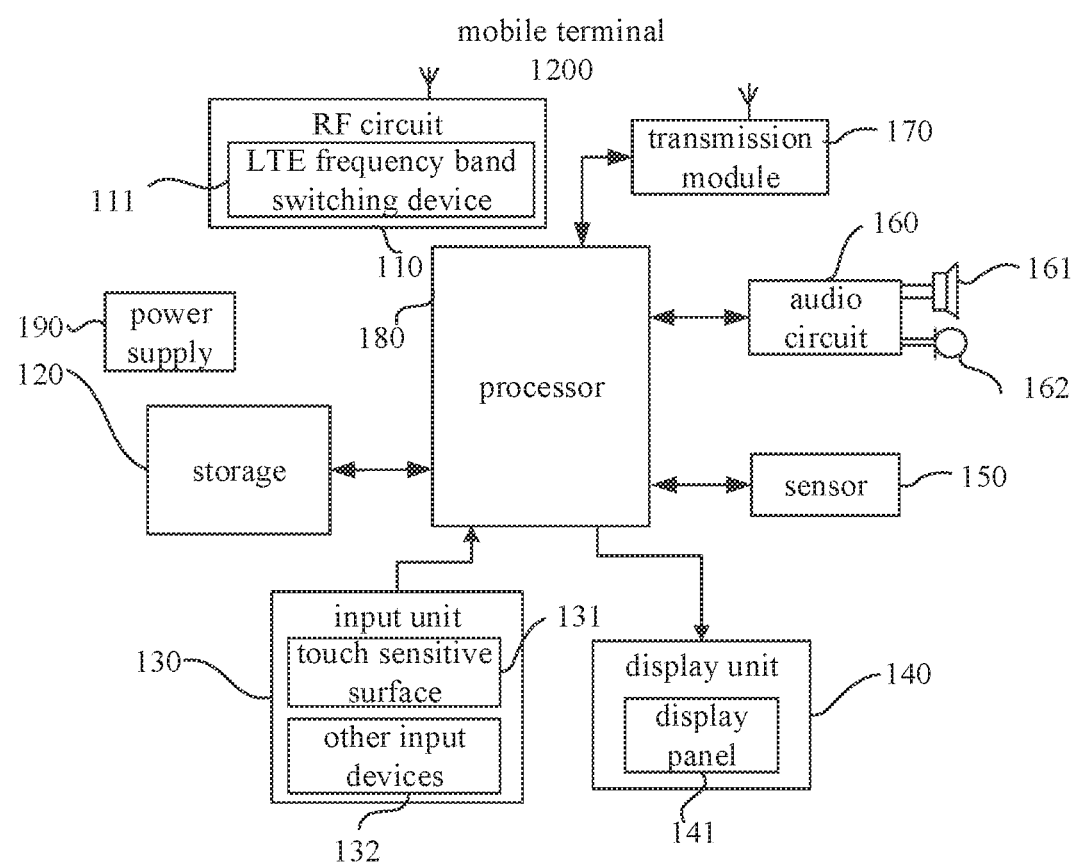
FIG. 5 is a structural block diagram showing a mobile terminal provided in an embodiment of the present invention.

FIG. 5 is a structural block diagram showing a mobile terminal provided in an embodiment of the present invention. The mobile terminal can be utilized to implement the LTE frequency band switching device and method, and the mobile terminal provided in afore-described embodiments. The mobile terminal 1200 can be a smartphone or a tablet computer.

As shown in FIG. 5, the mobile terminal 1200 may include a radio frequency (RF) circuit 110, a storage 120 including of one or more computer-readable storage media (a single one is merely illustrated in the drawings), an input module 130, a display unit 140, a sensor 150, an audio circuit 160, a transmission module 170, a processor 180 including one or more processing cores (a single one is merely illustrated in the drawings), a power supply 190, and etc. A person skilled in the art understands that the structure of the mobile terminal 1200 shown in FIG. 5 does not constitute a limitation to the mobile terminal 1200, and may include more or less components than those illustrated in the drawings. Furthermore, some components of the mobile terminal 1200 can be combined and/or arranged in different ways other than that shown in FIG. 5.

The RF circuit 110 is configured to receive and transmit electromagnetic waves to implement conversion between the electromagnetic waves and electrical signals, thereby communicating with a communication network or any other device. The RF circuit 110 may include various existing circuit components for executing the functions, for example, an antenna, an RF transceiver, a digital signal processor, an encryption/decryption chip, a subscriber identity module (SIM) card, a storage, and so on. The RF circuit 110 can communicate with various networks, such as internet, an intranet, or a wireless network, or can communicate with other devices via the wireless network. The above-mentioned wireless network may include a cellular network or a wireless local area network or metropolitan area network. The above-mentioned wireless network may use any one of communication standards, protocols, or technologies, including but not limited to Global System for Mobile communications (GSM), Enhanced Data GSM Environment (EDGE), Wideband Code Division Multiple Access (WCDMA), Code Division Multiple Access (CDMA), Time Division Multiple Access (TDMA), WIFI (such as standards of the Institute of Electrical and Electronics Engineers including IEEE802.11a, IEEE802.11b, IEEE 802.11g, and/or IEEE 802.11n), Voice over Internet Protocol (VoIP), Worldwide Interoperability for Microwave Access (Wi-Max), any other protocol for mails, instant communication, and short messages, any other suitable communication protocol, or any other protocol which has not been developed.

The RF circuit 110 further includes an LTE switching device 111. Specifically, a structural block diagram of the LTE switching device 111 may refer to FIG. 2. The LTE switching device 111 includes a power amplification module 10, a switching module 20, a duplexer 30, an antenna 50 and an antenna switch 40. An output signal is outputted to the switching module 20 after being amplified by the power amplification module 10; the switching module 20 divides the output signal into a plurality of frequency band signals and selects a current working frequency band according to a switching instruction; the duplexer 30 controls transceiving of a working frequency band signal; and when the antenna switch 40 is turned on, a current working frequency band signal is received or transmitted by the antenna 50. The LTE frequency band switching device further includes a conversion matching module for impedance matching.

Further, the power amplification module 10 includes a multi-mode multi-frequency power amplifier PA and a first filtering unit 101. The first filtering unit 101 performs a filtering process on a first power supply voltage inputted to the multi-mode multi-frequency power amplifier PA. The multi-mode multi-frequency power amplifier PA performs an amplifying process on the output signal and then outputs the output signal to the switching module 20.

In the mobile terminal, the switching module includes a switch SW and a second filtering unit 202. The second filtering unit 202 performs a filtering process on a second power supply voltage of the switch SW. The switch SW receives the amplified output signal, divides the output signal into the plurality of frequency band signals and selects the current working frequency band according to the switching instruction.

Further, the second filtering unit 202 is connected to the switch SW and a common end ANT of the switch SW is connected to an output pin of the multi-mode multi-frequency power amplifier PA.

Further, the switch SW is configured to receive the amplified output signal, divides the output signal into a first frequency band signal, a second frequency band signal, a third frequency band signal and a fourth frequency band signal, and selects the current working frequency band according to the switching instruction.

Further, the first filtering unit 101 includes a first capacitor C1, a second capacitor C2, a third capacitor C3, a fourth capacitor C4, a fifth capacitor C5 and a sixth capacitor C6. One end of the first capacitor C1 is connected to one end of the second capacitor C2, one end of the fourth capacitor C4, one end of the sixth capacitor C6 and a first power supply end (i.e., VBUS in the present embodiment). The one end of the second capacitor C2 is further connected to one end of the third capacitor C3 and a 28th pin of the multi-mode multi-frequency power amplifier PA, the one end of the fourth capacitor C4 is further connected to one end of the fifth capacitor C5 and a 29th pin of the multi-mode multi-frequency power amplifier PA, and the one end of the sixth capacitor C6 is further connected to a 30th pin of the multi-mode multi-frequency power amplifier PA. All of the other ends of the first capacitor C1, the second capacitor C2, the third capacitor C3, the fourth capacitor C4, the fifth capacitor C5 and the sixth capacitor C6 are grounded.

Further, the second filtering unit 202 includes a seventh capacitor C7, an eighth capacitor C8, a ninth capacitor C9 and a tenth capacitor C10. One end of the seventh capacitor C7 is connected to a fifth pin of the switch SW, one end of the eighth capacitor C8 is connected to a sixth pin of the switch SW, one end of the ninth capacitor C9 is connected to a seventh pin of the switch SW, one end of the tenth capacitor C10 is connected to a fourth pin of the switch SW and a second power supply end (i.e., VTCXO2 in the present embodiment). All of the other ends of the seventh capacitor C7, the eighth capacitor C8, the ninth capacitor C9 and the tenth capacitor C10 are grounded. A ninth pin of the switch SW is an output end (e.g., B7_TX_PA in the present embodiment) of the first frequency band signal, a tenth pin of the switch SW is the output end (e.g., B30_TX_PA in the present embodiment) of the second frequency band signal, a second pin of the switch SW is the output end (e.g., B40_TX_PA in the present embodiment) of the third frequency band signal, and a third pin of the switch SW is the output end (e.g., B41_TX_PA in the present embodiment) of the fourth frequency band signal.

Further, the conversion matching module 60 includes a converter U1, an eleventh capacitor C11, a twelfth capacitor C12 and an inductor L1. One end of the eleventh capacitor C11 is connected to a second pin of the converter U1, and one end of the twelfth capacitor C12 is connected to a sixth pin of the converter U1. All of the other ends of the eleventh capacitor C11 and the twelfth capacitor C12 are grounded. A fifth pin of the converter U1 is connected to a 42th pin of the multi-mode multi-frequency power amplifier PA.

Further, the multi-mode multi-frequency power amplifier PA is AP7219M.

Further, the switch SW is RF8614.

The storage 120 can be configured to store software programs and modules, such as the program instructions/modules corresponding to the LTE frequency band switching device, and the mobile terminal in above-mentioned embodiments. The processor 180 can perform various applications of functions and data processing by executing the software programs and modules stored in the storage 120 to implement the LTE frequency band switching function. The storage 120 may include high-speed random access memory, and may further include non-volatile memory such as one or more disk storage devices, a flash memory, or other non-volatile solid state storage. In some embodiments, the storage 120 also includes a remote storage disposed corresponding to the processor 180. The remote storage may be linked to the mobile terminal 1200 via a network. The network may include but not limited to at least one combination of internet, an intranet, a local area network, and a mobile communication network.

The input unit 130 can be configured to receive input numbers or character information, and generate signal input of a keyboard, a mouse, a joystick, or an optical trackball in relation to user settings and functional control. Specifically, the input unit 130 may include a touch sensitive surface 131 and any other input device 132. The touch sensitive surface 131, which is also called a touch screen or a touchpad, can gather a touch operation (for example, operations by use of a finger of a user, a stylus, and any other suitable object or attachment on or near the sensitive surface 131) applied on or near to the touch sensitive surface 131 by the user and drive a connected device according to preset programs. Optionally, the touch sensitive surface 131 may include a touch-sensitive device and a touch controller. The touch-sensitive device detects a direction of the user's touch, detects signals resulted from the touch operation, and transmits the signals to the touch controller. The touch controller receives information of the touch from the touch-sensitive device, converts it into a touch coordinate, further transmits the coordinate to the processor 180, and further receives and executes an instruction from the processor 180. Furthermore, the touch sensitive surface 131 may be implemented by utilizing capacitive, resistive, infrared, and surface acoustic wave technologies. In addition to the touch sensitive surface 131, the input unit 130 may further include any other input device 132. Specifically, the input device may include but not limited to one or any of the combination of a physical keyboard, function keys (such as volume control keys, switch keys, etc.), a trackball, a mouse, and a joystick.

The display unit 140 may be configured to display information inputted by the user, information provided for the user, or various types of graphical user interfaces of the mobile terminal 1200. The graphical user interfaces may include a graph, a text, an icon, a video, and any combination of them. The display unit 140 may include a display panel 141, optionally, which may be a liquid crystal display (LCD) or an Organic Light-Emitting Diode (OLED) display. Furthermore, the touch sensitive surface 131 may cover the display panel 141. When the touch sensitive surface 131 detects a touch operation on or near the touch sensitive surface 131 and transmits a corresponding signal to the processor 180 to determine a type of the touch event, the processor 180 controls the display panel 141 to provide appropriate visual output according to the type of the touch event. Although the touch sensitive surface 131 and the display panel 141 in FIG. 5 are two separate components for implementing input and output functions, the touch sensitive surface 131 and the display panel 141 may be integrated into one component for implementing the input and output functions in some embodiments.

The mobile terminal 1200 may further include at least one sensor 150, such as a light sensor, a motion sensor, and other sensors. Specifically, the light sensor can include an ambient light sensor and a proximity sensor. The ambient light sensor can adjust the brightness of the display panel 141 according to bright or dark as to the ambient light. The proximity sensor can turn off the display panel 141 and/or the backlight when the mobile terminal 1200 is moved close to ears. As one type of the motion sensor, a gravity sensor (G-sensor) can detect acceleration speed on all directions (generally up to three axis), can detect magnitude and direction of the gravity when it stays still, and can identify a gesture in a cell phone application (such as a screen switch between landscape style and portrait style, relevant games, and magnetometer calibration) and recognize vibration patterns to identify relevant functions (such as pedometer, and knock), and so on. Additionally, a gyroscope, a barometer, a hygrometer, a thermometer, an infrared sensor, and any other sensor can be deployed in the mobile terminal 1200, and the details for these are not repeated herein.

The audio circuit 160, a speaker 161, and a microphone 162 provide an audio interface between the user and the mobile terminal 1200. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to an electrical signal. The audio circuit 160 converts the electrical signal to audio data and transmits the audio data to the processor 180 for further processing. After the processing, the audio data may be transmitted to another terminal via the RF circuit 110, or transmitted to the storage 120 for further processing. The audio circuit 160 may further include an earphone jack for providing communication between an external earphone and the mobile terminal 1200.

The mobile terminal 1200 can be configured to, by the transmission module 170 (such as a WIFI module), send and receive emails, browse a webpage, and access to streaming media, and so on. It provides the user with wireless broadband internet access. It should be understood that although the transmission module 170 is illustrated in FIG. 5, this module is not an essential component for the mobile terminal 1200 and can be omitted according to needs without departing from the scope of the present invention.

The processor 180 functions as a control center of the mobile terminal 1200 and is configured to connect each component of the cell phone using various interfaces and circuits, and is configured to execute the various functions of the mobile terminal 1200 and to perform data processing by running or executing the software programs and/or modules stored in the storage 120 and calling the data stored in the storage 120, thereby monitoring the overall mobile terminal 1200. Optionally, the processor 180 can include one or more processing cores. In some embodiments, an application processor and a modulation/demodulation processor can be integrated to form the processor 180. The application processor is primarily configured to process an operating system, user interfaces, application programs, and so on. The modulation/demodulation processor is primarily configured to process wireless communication. It should be understood that the modulation/demodulation processor can be independent from the processor 180.

The mobile terminal 1200 further includes the power supply 190 configured to provide power for the various components of the mobile terminal 1200. In some embodiments, the power supply can be logically coupled to the processor 180 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the mobile terminal 1200 may include a camera (such as a front camera and a rear camera), a BLUETOOTH module, and so on. They are not repeated herein. In the present embodiment, a display unit of the mobile terminal is a display with a touch screen. The mobile terminal further includes a storage and one or more programs. The one or more programs are stored in the storage. After configuration, one or more processors execute the one or more programs, which include the following operating instructions:

executing the following steps when the processor detects that LTE frequency band switching is needed to be performed:

outputting an output signal to a switching module 20 after the output signal is amplified by a power amplification module 10;

by the switching module 20, dividing the output signal into a plurality of frequency band signals and selecting a current working frequency band according to a switching instruction;

controlling transceiving of a working frequency band signal by a duplexer 30, and receiving or transmitting a current working frequency band signal by an antenna 50 when an antenna switch 40 is turned on.

Above all, in the LTE frequency band switching device and method, and the mobile terminal provided in the present invention, the device includes a power amplification module, a switching module, a duplexer, an antenna switch and an antenna. An output signal is outputted to the switching module after being amplified by the power amplification module; the switching module divides same into a plurality of frequency band signals, and selects a current working frequency band according to a switching instruction; the duplexer controls the transceiving of a working frequency band signal; and when the antenna switch is turned on, the current working frequency band signal is transceived by the antenna. By adopting a combination of a low-cost single-path power amplification module and a switching module, multi-path frequency band communication and switching is realized. This not only flexibly satisfies the requirement of multiple frequency bands but also saves the cost.

It should be understood that those of ordinary skill in the art may make equivalent modifications or variations according to the technical schemes and invention concepts of the present invention, but all such modifications and variations should be within the appended claims.

What is claimed is:

1. An Long-Term Evolution (LTE) frequency band switching device, comprising:
   a power amplification module, configured to amplify an output signal and output the amplified output signal;
   a switching module, connected to the power amplification module, configured to divide the amplified output signal into a plurality of frequency band signals and select a current working frequency band according to a switching instruction;
   a duplexer, connected to the switching module, configured to control transceiving of a current working frequency band signal;
   an antenna switch, connected to the duplexer; and
   an antenna, connected to the antenna switch, configured to receive or transmit the current working frequency band signal when the antenna switch is turned on,
   wherein the power amplification module comprises a multi-mode multi-frequency power amplifier and a first filtering unit, the first filtering unit comprises a plurality of coupled capacitors configured to perform a filtering process on a first power supply voltage inputted to the multi-mode multi-frequency power amplifier, the multi-mode multi-frequency power amplifier performs a amplifying process on the output signal and then outputs the amplified output signal to the switching module,
   wherein the switching module comprises a switch and a second filtering unit, the second filtering unit comprises a plurality of coupled capacitors configured to perform a filtering process on a second power supply voltage of the switch, the switch receives the amplified output signal, divides the amplified output signal into the plurality of frequency band signals and selects the current working frequency band according to the switching instruction,
   wherein the plurality of coupled capacitors of the first filtering unit comprise a first capacitor, a second capacitor, a third capacitor, a fourth capacitor, a fifth capacitor and a sixth capacitor, one end of the first capacitor is connected to one end of the second capacitor, one end of the fourth capacitor, one end of the sixth capacitor and a first power supply end, the one end of the second capacitor is further connected to one end of the third capacitor and a 28th pin of the multi-mode multi-frequency power amplifier, the one end of the fourth capacitor is further connected to one end of the fifth capacitor and a 29th pin of the multi-mode multi-frequency power amplifier, the one end of the sixth capacitor is further connected to a 30th pin of the multi-mode multi-frequency power amplifier, all of the other ends of the first capacitor, the second capacitor, the third capacitor, the fourth capacitor, the fifth capacitor and the sixth capacitor are grounded.

2. The LTE frequency band switching device according to claim 1, wherein the switch is configured to divide the amplified output signal into a first frequency band signal, a second frequency band signal, a third frequency band signal and a fourth frequency band signal.

3. The LTE frequency band switching device according to claim 2, wherein the plurality of coupled capacitors of the second filtering unit comprise a seventh capacitor, an eighth capacitor, a ninth capacitor and a tenth capacitor, one end of the seventh capacitor is connected to a fifth pin of the switch, one end of the eighth capacitor is connected to a sixth pin of the switch, one end of the ninth capacitor is connected to a seventh pin of the switch, one end of the tenth capacitor is connected to a fourth pin of the switch and a second power supply end, all of the other ends of the seventh capacitor, the eighth capacitor, the ninth capacitor and the tenth capacitor are grounded; a ninth pin of the switch is an output end of the first frequency band signal, a tenth pin of the switch is the output end of the second frequency band signal, a second pin of the switch is the output end of the third frequency band signal, a third pin of the switch is the output end of the fourth frequency band signal.

4. The LTE frequency band switching device according to claim 1, wherein the multi-mode multi-frequency power amplifier is AP7219M.

5. The LTE frequency band switching device according to claim 1, wherein the switch is RF8614.

6. An Long-Term Evolution (LTE) frequency band switching method, comprising steps of:
   by a power amplification module, amplifying an output signal and outputting the amplified output signal to a switching module;
   by the switching module, dividing the amplified output signal into a plurality of frequency band signals and selecting a current working frequency band according to a switching instruction; and
   controlling transceiving of a current working frequency band signal by a duplexer, and receiving or transmitting the current working frequency band signal by an antenna when an antenna switch is turned on,
   wherein the power amplification module comprises a multi-mode multi-frequency power amplifier and a first filtering unit, the first filtering unit comprises a plurality of coupled capacitors configured to perform a filtering process on a first power supply voltage inputted to the multi-mode multi-frequency power amplifier, the multi-mode multi-frequency power amplifier performs a amplifying process on the output signal and then outputs the amplified output signal to the switching module,
   wherein the switching module comprises a switch and a second filtering unit, the second filtering unit comprises a plurality of coupled capacitors configured to perform a filtering process on a second power supply voltage of the switch, the switch receives the amplified output signal, divides the amplified output signal into the plurality of frequency band signals and selects the current working frequency band according to the switching instruction,
   wherein the plurality of coupled capacitors of the second filtering unit comprise a seventh capacitor, an eighth capacitor, a ninth capacitor and a tenth capacitor, one end of the seventh capacitor is connected to a fifth pin of the switch, one end of the eighth capacitor is connected to a sixth pin of the switch, one end of the ninth capacitor is connected to a seventh pin of the switch, one end of the tenth capacitor is connected to a fourth pin of the switch and a second power supply end, all of the other ends of the seventh capacitor, the eighth capacitor, the ninth capacitor and the tenth capacitor are grounded; a ninth pin of the switch is an output end of the first frequency band signal, a tenth pin of the switch is the output end of the second frequency band signal, a second pin of the switch is the output end of the third frequency band signal, a third pin of the switch is the output end of the fourth frequency band signal.

7. The method according to claim 6, wherein the first filtering unit is connected to the multi-mode multi-frequency power amplifier and the multi-mode multi-frequency power amplifier is connected to the switching module, and the second filtering unit is connected to the switch and a common end of the switch is connected to an output pin of the multi-mode multi-frequency power amplifier.

8. The method according to claim 7, wherein the switch is configured to divide the amplified output signal into a first frequency band signal, a second frequency band signal, a third frequency band signal and a fourth frequency band signal.

9. A mobile terminal, comprising a radio frequency (RF) circuit and an Long-Term Evolution (LTE) frequency band switching device disposed in the RF circuit, the LTE frequency band switching device comprising:
a power amplification module, configured to amplify an output signal and output the amplified output signal;
a switching module, connected to the power amplification module, configured to divide the amplified output signal into a plurality of frequency band signals and select a current working frequency band according to a switching instruction;
a duplexer, connected to the switching module, configured to control transceiving of a current working frequency band signal;
an antenna switch, connected to the duplexer; and
an antenna, connected to the antenna switch, configured to receive or transmit the current working frequency band signal when the antenna switch is turned on, wherein the power amplification module comprises a multi-mode multi-frequency power amplifier and a first filtering unit, the first filtering unit comprises a plurality of coupled capacitors configured to perform a filtering process on a first power supply voltage inputted to the multi-mode multi-frequency power amplifier, the multi-mode multi-frequency power amplifier performs a amplifying process on the output signal and then outputs the amplified output signal to the switching module,
wherein the switching module comprises a switch and a second filtering unit, the second filtering unit comprises a plurality of coupled capacitors configured to perform a filtering process on a second power supply voltage of the switch, the switch receives the amplified output signal, divides the amplified output signal into the plurality of frequency band signals and selects the current working frequency band according to the switching instruction,
wherein the LTE frequency band switching device further comprises a conversion matching module configured to perform impedance matching on the power amplification module, wherein the conversion matching module is connected to the power amplification module, the conversion matching module comprises a converter, a eleventh capacitor, a twelfth capacitor and an inductor, one end of the eleventh capacitor is connected to a second pin of the converter, one end of the twelfth capacitor is connected to a sixth pin of the converter, all of the other ends of the eleventh capacitor and the twelfth capacitor are grounded, a fifth pin of the converter is connected to a 42th pin of the multi-mode multi-frequency power amplifier.

10. The mobile terminal according to claim 9, wherein the first filtering unit is connected to the multi-mode multi-frequency power amplifier and the multi-mode multi-frequency power amplifier is connected to the switching module.

11. The mobile terminal according to claim 10, wherein the plurality of coupled capacitors of the first filtering unit comprise a first capacitor, a second capacitor, a third capacitor, a fourth capacitor, a fifth capacitor and a sixth capacitor, one end of the first capacitor is connected to one end of the second capacitor, one end of the fourth capacitor, one end of the sixth capacitor and a first power supply end, the one end of the second capacitor is further connected to one end of the third capacitor and a 28th pin of the multi-mode multi-frequency power amplifier, the one end of the fourth capacitor is further connected to one end of the fifth capacitor and a 29th pin of the multi-mode multi-frequency power amplifier, the one end of the sixth capacitor is further connected to a 30th pin of the multi-mode multi-frequency power amplifier, all of the other ends of the first capacitor, the second capacitor, the third capacitor, the fourth capacitor, the fifth capacitor and the sixth capacitor are grounded.

12. The mobile terminal according to claim 9, wherein the second filtering unit is connected to the switch and a common end of the switch is connected to an output pin of the multi-mode multi-frequency power amplifier.

13. The mobile terminal according to claim 12, wherein the switch is configured to divide the amplified output signal into a first frequency band signal, a second frequency band signal, a third frequency band signal and a fourth frequency band signal.

14. The mobile terminal according to claim 13, wherein the plurality of coupled capacitors of the second filtering unit comprise a seventh capacitor, an eighth capacitor, a ninth capacitor and a tenth capacitor, one end of the seventh capacitor is connected to a fifth pin of the switch, one end of the eighth capacitor is connected to a sixth pin of the switch, one end of the ninth capacitor is connected to a seventh pin of the switch, one end of the tenth capacitor is connected to a fourth pin of the switch and a second power supply end, all of the other ends of the seventh capacitor, the eighth capacitor, the ninth capacitor and the tenth capacitor are grounded; a ninth pin of the switch is an output end of the first frequency band signal, a tenth pin of the switch is the output end of the second frequency band signal, a second pin of the switch is the output end of the third frequency band signal, a third pin of the switch is the output end of the fourth frequency band signal.

15. The mobile terminal according to claim 9, wherein the multi-mode multi-frequency power amplifier is AP7219M.

16. The mobile terminal according to claim 9, wherein the switch is RF8614.

* * * * *